March 29, 1960        H. R. LEEDY        2,930,570
PINCH CLAMP
Filed Jan. 30, 1959
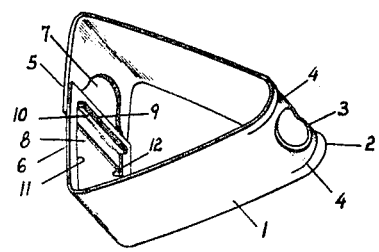
Fig. 1
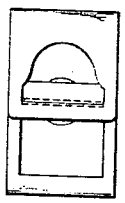 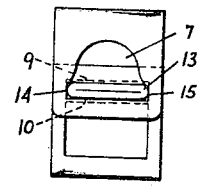 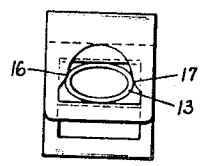 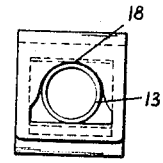
Fig. 2      Fig. 3      Fig. 4      Fig. 5
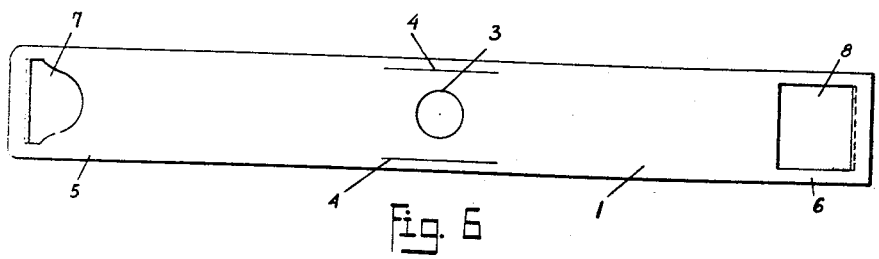
Fig. 6
*INVENTOR.*
HERBERT R. LEEDY
BY
Bates, Teare & McBean
ATTORNEYS 2,930,570
PINCH CLAMP Herbert R. Leedy, Cleveland, Ohio Application January 30, 1959, Serial No. 790,164

4 Claims. (Cl. 251—10)

This invention relates, as indicated, to an improved pinch clamp of the type normally used for controlling the flow of fluids through resiliently flexible tubing, such as rubber tubing.

One of the principal difficulties with pinch clamps heretofore available has been a failure under certain circumstances to give a positive shut-off under certain conditions. While such devices may be entirely satisfactory in operation when the resiliently flexible tube is in proper alignment within the clamping device, if this alignment is disturbed and, for example, the tube is forced into a position out of alignment, the ability of the pinch clamp to give positive shut-off is frequently impaired.

It is a principal object of this invention, therefore, to provide a pinch clamp for use with resiliently flexible tubes which is improved in respect of maintaining proper alignment of the tube during the clamping and releasing operation such that improved shut-off can be secured.

Other objects of the invention will appear as the description proceeds.

In the annexed drawings:

Fig. 1 is an illustration of a pinch clamp of the normally closed type in accordance with the present invention.

Figs. 2, 3, 4 and 5 are front views of the device shown in Fig. 1.

Fig. 2 has no flexible tube shown therein.

Fig. 3, Fig. 4 and Fig. 5 show front views of the clamping end of the device of Fig. 1 with the rubber or flexible tube in place during various stages of releasing the tube for flow of fluid therethrough.

Fig. 6 is a development of the device shown in Fig. 1.

Briefly, this invention embodies a pinch clamp for opening and closing a resiliently flexible tube in the form of a substantially U-shaped metallic strap with each free end of the strap being deformed inwardly toward the other and adapted to overlap the other when the ends are compressed toward each other. Each of the inwardly deformed ends has an aperture formed therein to receive the tube and is provided with inwardly directed flange portions along adjacent marginal edges thereof with a first flange portion on one of the free extremities extending into the aperture in the other free extremity. The flange receiving aperture has spaced parallel marginal edges for guiding the received flange toward and away from clamping engagement with the other flange portion and the flange portions are adapted to co-act as clamping surfaces when in contact with opposite sides of a resiliently flexible tube. The other aperture has a configuration related to the peripheral configuration of the tube during clamping and releasing thereof such that opposing peripheral edges of said aperture are maintained in contact with lateral portions of said tube.

Referring now more particularly to Fig. 1 there is here shown a metallic strap 1 of substantially U-shape having a bend 2 forming the valley of the U-shape. An aperture 3 is conveniently provided through the bend 2 to receive a resiliently flexible tube. Deformations 4 impressed into the metal strap 1 on either side of the aperture 3 may be used as means for stiffening the metallic strap adjacent the valley aperture 3, if desired. The ends of the metallic strap 1 opposite the bend 2 are deformed inwardly toward each other and adapted to overlap each other when the ends are compressed toward each other.

Preferably the ends 5 and 6 are curved to conform substantially to the arc of travel so that on compressing and releasing the ends the distance between the relatively overlapping ends is substantially constant.

Each of the inwardly deformed ends 5 and 6 has an aperture formed therein to permit passage of the tube therethrough. Along adjacent marginal edges of the apertures 7 and 8 are inwardly directed flanges 9 and 10, respectively. The flange portion 10 is formed at the extremity of the free end 5 and extend into the aperture 8 in the other free end 6. The aperture 8 has spaced parallel marginal edges 11 and 12 for guiding the flange 10 toward and away from clamping engagement with the flange 9. The flange 9 is formed in the extremity of the end 6 and is, as shown in Fig. 1, also inwardly directed. The flange portions 9 and 10 are adapted to co-act as clamping surfaces when in contact with opposite sides of a resiliently flexible tube, as shown, for example, in Fig. 3.

The aperture 7 has a configuration which is related to the peripheral configuration of the resiliently flexible tube during the clamping and releasing operations. Figs. 3, 4 and 5 illustrate the opening of a clamped resiliently flexible tube 13 gripped between the clamping faces of flanges 9 and 10. The vertical portions 14 and 15 of the aperture 7 as shown in Figs. 3, 4 and 5 do not conform exactly to the contour of the compressed rubber of flexible tube 13 for reasons only of ease of manufacture. The side portions 14 and 15 of the aperture periphery could just as well conform to the outer periphery of the compressed tube 13. As the tube expands by moving flanges 9 and 10 apart, the convex portions 16 and 17 of the periphery are tangent to laterally extending portions of the tube 13. In Fig. 5, the tube is fully opened and assumes its circular cross section and the concave portion 18 of the aperture 7 conforms with the outer periphery of the tube 13. The generation of the curve defining the periphery of the aperture 7 may be regarded as the locus of points on the surface of the rubber tube of greatest lateral displacement. The periphery of the aperture 7 is then composed of a straight portion defined by the flange 10, straight side portions 14 and 15, convex portions 16 and 17, and concave portion 18. As indicated above, the side portions 14 and 15 are straight, simply as a matter of convenience in forming the device shown in Fig. 1 by a stamping operation to give a blank such as shown in Fig. 6. Portions 14 and 15 might as well be concave to follow the contour of the laterally extending edges of the compressed tube 13 as shown in Fig. 3.

Fig. 6 shows a blank from which the clamps shown in Fig. 1 may be made. The rectangular aperture 8 is cut out of the end 6 and especially shaped aperture 7 is stamped out of the end 5 of the metal strap 1. Intermediate the ends is a circular aperture 3 for receiving resiliently flexible tube, and if desired strengthening ribs 4 may also be impressed in the metal strap 1 in the areas between the marginal edges of the strap 1 and the periphery of the aperture 3.

In operation, a flexible resilient tube such as a rubber tube or a plastic tube is inserted through the aperture 3 and through the overlying apertures 7 and 8 when the free ends 5 and 6 are compressed as shown in Fig. 5. As pressure is released from the free ends 5 and 6, the clamp normally assumes the position shown in Fig. 3 and gives a complete and positive shut-off preventing fluid from flowing through a tubular member 13. If during usage forces are brought to play on the tube 13 tending to misalign it with respect to the apertures 3, 7 and 8, the effect of the contour of the periphery of the aperture 7 is to maintain the tube in proper alignment so that at all times positive shut off is secured.

Thus there has been provided an improved pinch clamp which permits better shut-off action because of its improved ability to maintain the flexible tube in proper position for complete closure, even when forces normally tending to misalign the tube are in effect.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. A pinch clamp for opening and closing a resiliently flexible tube comprising a substantially U-shaped metallic strap, each free end of said strap being deformed inwardly toward the other and adapted to overlap the other when the ends are compressed toward each other, each of said inwardly deformed ends having an aperture formed therein to receive the tube, and inwardly directed flange portions along adjacent marginal edges thereof, a first flange portion on one of said free extremities extending into the aperture in the other free extremity, said last-mentioned aperture having spaced parallel marginal edges for guiding said first flange toward and away from clamping engagement with the other flange portion, said flange portions adapted to coact as clamping surfaces when in contact with opposite sides of a resiliently flexible tube, the other aperture having a configuration related to the peripheral configuration of the tube during clamping and releasing thereof, such that opposing peripheral edges of said aperture are maintained in contact with lateral portions of said tube.

2. A pinch clamp in accordance with claim 1 in which the overlapping inwardly deformed ends have a common convex profile whereby on compressing and releasing the ends, the distance between the relatively overlapping ends is substantially constant.

3. A pinch clamp for opening and closing a resiliently flexible tube comprising a substantially U-shaped metallic strap, said strap having an aperture through the valley portion of said U adapted to receive a resiliently flexible tube, each free end of said strap being deformed inwardly toward the other and adapted to overlap the other when the ends are compressed toward each other, each of said inwardly deformed ends having an aperture formed therein to receive the tube, and inwardly directed flange portions along adjacent marginal edges thereof, a first flange portion on one of said free extremities extending into the aperture in the other free extremity, said last-mentioned aperture having spaced parallel marginal edges for guiding said first flange toward and away from clamping engagement with the other flange portion, said flange portions adapted to co-act as clamping surfaces when in contact with opposite sides of a resiliently flexible tube, the other aperture having a configuration related to the peripheral configuration of the tube during clamping and releasing thereof such that opposing peripheral edges of said aperture are maintained in contact with lateral portions of said tube.

4. A pinch clamp for opening and closing a resiliently flexible tube comprising a substantially U-shaped metallic strap, said strap having a valley aperture through the valley portion of said U, adapted to receive a resiliently flexible tube, means between the marginal edges of said valley aperture and the marginal edges of said metallic strap for stiffening said metallic strap adjacent said valley aperture, each free end of said strap being deformed inwardly toward the other and adapted to overlap the other when the ends are compressed toward each other, each of said inwardly deformed ends having an aperture formed therein to receive the tube, and inwardly directed flange portions along adjacent marginal edges thereof, a first flange portion on one of said free extremities extending into the aperture in the other free extremity, said last-mentioned aperture having spaced parallel marginal edges for guiding said first flange toward and away from clamping engagement with the other flange portion, said flange portions adapted to coact as clamping surfaces when in contact with opposite sides of a resiliently flexible tube, the other aperture having a configuration related to the peripheral configuration of the tube during clamping and releasing thereof, such that opposing peripheral edges of said aperture are maintained in contact with lateral portions of said tube.

References Cited in the file of this patent

UNITED STATES PATENTS

| | | |
|---|---|---|
| 455,392 | Ellis | July 7, 1891 |
| 2,112,625 | Jackson | Mar. 29, 1938 |
| 2,385,274 | Hammond | Sept. 18, 1945 |